Figure 1:
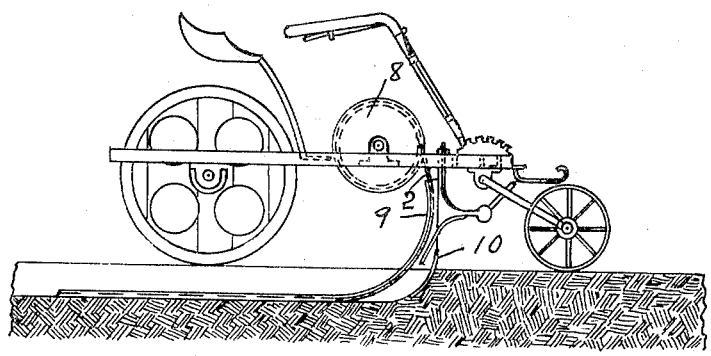

Sept. 25, 1956  W. A. KENNON  2,763,991
DEVICE FOR TREATING SOIL
Filed June 19, 1952  2 Sheets-Sheet 1

INVENTOR.
Woodrow A. Kennon
BY Chas. Denegre
Attorney.

Sept. 25, 1956  W. A. KENNON  2,763,991
DEVICE FOR TREATING SOIL
Filed June 19, 1952  2 Sheets—Sheet 2

INVENTOR.
Woodrow A. Kennon
BY Chas. Senegre
Attorney.

United States Patent Office 2,763,991
Patented Sept. 25, 1956

2,763,991
DEVICE FOR TREATING SOIL

Woodrow A. Kennon, Birmingham, Ala.

Application June 19, 1952, Serial No. 294,415

1 Claim. (Cl. 61—13)

This invention relates to an improved device for sub-irrigating, aerating, draining, thawing, heating, sterilizing and fumigating of soil. It consists of a tight woven, permeable, fiber seep-hose, made of rust-proof, rot-proof material such as fiber-glass or other suitable material. The space within the walls of the hose is to be filled with a suitable rust and rot-proof material, fairly hard and non-absorbent, this may be porous, such as pea-size rock, glass or plastic pellets, or coarse glass fiber. Also there may be used, perforated tubing that is semi-rigid and flexible, made of plastic, glass or some other suitable material in order to keep the hose inflated to allow a free flow of fluid, gas, air or the like. It is believed that the present invention would be superior to one made of molded material with perforated holes, because of its ability to prevent soil particles from filtering through to the inside. It would provide more holes per square inch so as to give free and easy seepage, not a forceful spewing effect. Also, a hose made of glass fiber would be more resistant to any chemical used in fertilizing or fumigating.

The hose would be placed at the desired depth in the soil. There are chisel or panbreaking machines for farm use on the market that penetrate to a depth of three feet or more. The hose could be laid level or terraced downward so when applying fluid it would flow by gravity combined with force. The hose could be laid in the soil at any desired depth or pattern. The starting point would be, preferably, at the highest elevation nearest the source of material to be applied. At the starting point an impervious hose or pipe would be connected to the pervious hose to be placed beneath the surface of the soil. The other end of the pervious hose would be closed by any suitable means.

The hose could be placed beneath the surface of the soil by any suitable means, but I prefer to use a machine suitable for the purpose such as a cable laying machine. The hose would be on a reel. The reel and frame for holding same could be mounted on a cable laying machine, or tractor, or mobile reel carrier. The machine would start at the desired place. As its chisel or plow point entered the soil the first few feet of the hose would be impervious, the pervious hose to start at the desired depth beneath the surface. After the hose is laid in the opening in the soil the same could be closed by any suitable means.

Other objects and advantages will appear from the drawings and description.

Figure 2:
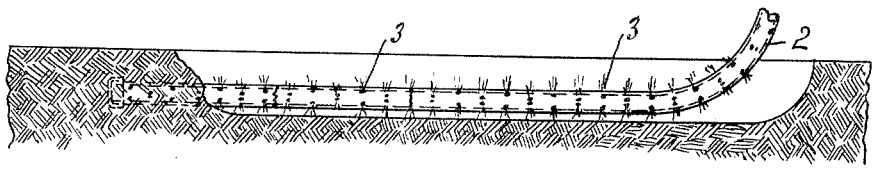
Figure 3:
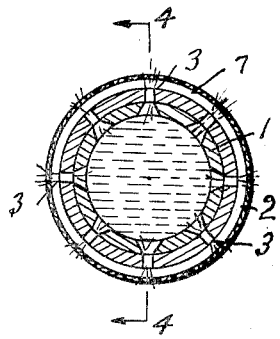
Figure 4:
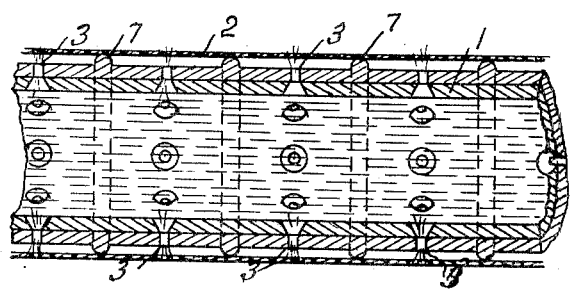
Figure 5:
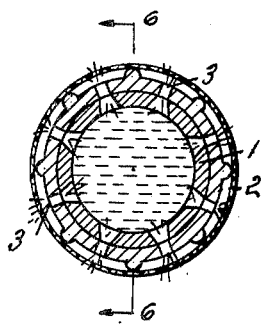
Figure 6:
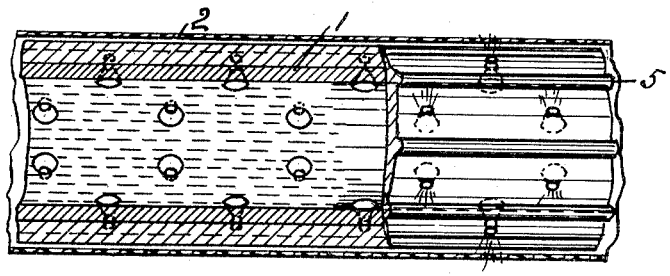
Figure 7:
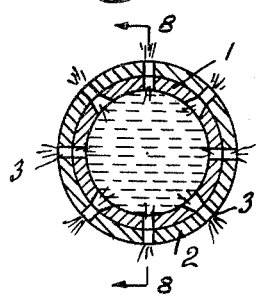
Figure 8:
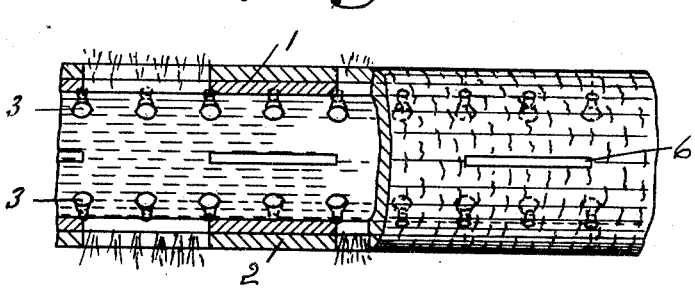
Figure 9:
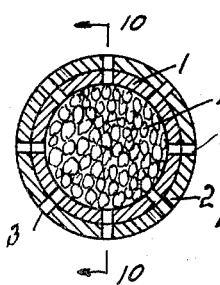
Figure 10:
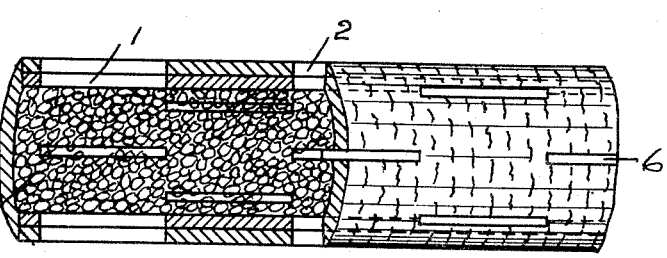

By referring generally to the drawings, a part of this application, it will be observed that Fig. 1 is a side elevational view of a cable laying machine of the type used in laying hose according to the present invention; Fig. 2 is an enlarged sectional view of part of soil with part of hose therein; Fig. 3 is a cross sectional view of one form of hose used; Fig. 4 is a sectional view on line 4—4 of Fig. 3; Fig. 5 is a cross sectional view of another form of hose used; Fig. 6 is a sectional and full view on line 6—6 of Fig. 5; Fig. 7 is a sectional view of another form of hose used; Fig. 8 is a sectional and full view on line 8—8 of Fig. 7; Fig. 9 is a sectional view of another form of hose used with small pebbles or glass beads therein; and Fig. 10 is a sectional and full view on line 10—10 of Fig. 9.

Similar reference numerals refer to similar parts throughout the several views.

Referring to the drawings in detail it will be seen that the method for treating the soil requires suitable hose for the purpose. The hose comprises a semi-rigid tube 1 that may be fiber glass, rubber, or plastic. It is covered with woven fiber 2 and provided with a plurality of holes 3. The interior of the hose is filled with pebbles 4, or small pieces of crushed rock, or glass pellets. The hose semi-rigid portion is provided with integral ridges 5 or 6 that are parallel with the hose lengthwise, or circular 7 spaced apart. The object of the ridges is to prevent the woven fabric portion from fitting too tight adjacent the semi-rigid portion. The hose may be made without any woven fabric covering if desired.

The hose is placed beneath the surface of the soil in a satisfactory manner by use of a cable laying machine as shown in Fig. 1 provided with a reel 8 with a guide tube 9 and a blade 10 for cutting a groove in the soil.

From the foregoing it will appear that after the hose is properly laid in the soil it is ready for use with very little attention required for upkeep. It will be below the cultivating depth. It will save on water as there will be less evaporation than in the sprinkling system. The soil may be irrigated to the desired saturation point without making the surface muddy. Liquid or soluble fertilizer could be applied to the soil along with water. The soil could be aerated by forcing air through the hose. By the use of warm or hot air, freeze and frost damage could be prevented; frozen ground could be thawed for early cultivation; wet soil could be dried.

While I have shown and described the preferred embodiment of my invention, I do not wish to limit same to the exact and precise details of structure, but reserve the right to make modifications and changes so long as they remain within the scope of the invention and the following claim.

Having described my invention I claim:

A device for treating soil consisting of a comparatively long piece of pervious hose having a semi-rigid wall, said hose provided with a plurality of small holes, a plurality of small ridges formed upon the outer face of the hose, a covering of fabric upon the ridges on the hose, one end of the hose being closed, a comparatively short piece of impervious hose attached to the open end of the longer piece of hose, said pervious hose being filled with particles of hard water-proof material such as pebble stones.

References Cited in the file of this patent

UNITED STATES PATENTS

| 1,173,534 | Ryan | Feb. 29, 1916 |
| 1,513,937 | Seidler | Nov. 4, 1924 |
| 1,875,504 | Salisbury | Sept. 6, 1932 |
| 2,084,005 | Richards | June 15, 1937 |
| 2,346,029 | Jennings | Apr. 4, 1944 |
| 2,445,717 | Richards | July 20, 1948 |
| 2,525,897 | Greene | Oct. 17, 1950 |

FOREIGN PATENTS

| 212,721 | Germany | Aug. 9, 1909 |
| 283,035 | Great Britain | Jan. 5, 1928 |
| 409,585 | Great Britain | May 3, 1934 |

OTHER REFERENCES

Hackh's Chemical Dictionary, 3rd ed., pub. 1944 by Blakiston (Phila.), pp. 620, 632, 633.